US007498558B2

(12) United States Patent
Sparrold et al.

(10) Patent No.: US 7,498,558 B2
(45) Date of Patent: Mar. 3, 2009

(54) SCINTILLATION HARDENED SEMI-ACTIVE LASER SENSOR

(75) Inventors: Scott W. Sparrold, Vail, AZ (US); R. Hamilton Shepard, III, Tucson, AZ (US); Patrick L. McCarthy, Tucson, AZ (US); Richard C. Juergens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/206,980

(22) Filed: Aug. 18, 2005

(65) Prior Publication Data

US 2007/0290120 A1 Dec. 20, 2007

(51) Int. Cl.
*H01J 3/14* (2006.01)
(52) U.S. Cl. .................... 250/216; 359/741; 359/743
(58) Field of Classification Search .............. 250/216; 359/707, 708, 599, 719, 565, 566, 569, 570, 359/571, 574, 741–743
See application file for complete search history.

(56) References Cited

U.S. PATENT DOCUMENTS

| 4,111,561 A * | 9/1978 | Plummer ................. 356/225 |
| 6,540,382 B1 * | 4/2003 | Simon .................... 362/339 |
| 6,923,539 B2 * | 8/2005 | Simpson et al. ......... 351/160 R |
| 2003/0072083 A1 * | 4/2003 | Smith .................... 359/619 |
| 2003/0170442 A1 * | 9/2003 | Kaminsky et al. ........ 428/315.5 |
| 2005/0174643 A1 * | 8/2005 | Lee et al. ............... 359/566 |
| 2005/0200976 A1 * | 9/2005 | Bonitz et al. ............ 359/708 |

* cited by examiner

*Primary Examiner*—Davienne Monbleau
(74) *Attorney, Agent, or Firm*—The Noblitt Group, PLLC

(57) ABSTRACT

The disclosed system, device and method for spatial homogenization and focusing of electromagnetic radiation over an aperture to reduce the effects of atmospheric scintillation generally includes an optical lens having an at least partially undulating pattern mapped onto a curvilinear surface. Disclosed features and specifications may be variously controlled, adapted or otherwise optionally modified to eliminate or otherwise reduce the effects of atmospheric scintillation as well as other optical aberrations. Exemplary embodiments of the present invention generally provide improved systems and methods for the acquisition, tracking and engagement of military targets with missiles or other guided ordinance.

20 Claims, 9 Drawing Sheets

SCINTILLATION HARDENED SEMI-ACTIVE LASER SENSOR

FIELD OF INVENTION

The present invention generally concerns optical systems; and more particularly, representative and exemplary embodiments of the present invention generally relate to improved optical methods and systems for mitigating atmospheric scintillation effects.

BACKGROUND OF INVENTION

Adaptive optics and compensated imaging systems are generally used to correct aberrations in input laser beams. For example, a laser beam may be transmitted through the atmosphere from a remote source to a receiver or other detector. Atmospherically induced scintillation may cause substantial aberrations of the input beam. Conventional adaptive optics and compensated imaging systems have been employed at receiving sites to correct for such aberrations via performance of wavefront "scrubbing".

It has been suggested that the presence of amplitude variations due to atmospheric scintillation and device inhomogeneities may substantially degrade the performance of adaptive optical systems in certain operational modes. For example, in a liquid crystal light valve (LCLV), although small amplitude variations may not degrade performance significantly, very large amplitude fluctuations may be considerably problematic. Such an adaptive optical system for phase compensation is generally described by Cardinal Warde et al. in "High Resolution Adaptive Phase Compensation for Low-Visibility Optical Communication", Proc. IEEE, Vol. 68, pp. 539-545 (1980).

In various military applications, missiles and other guided ordinance may be configured to track and engage targets via remote laser designation; however, atmospherically induced scintillation effects will typically produce guidance errors, causing the ordinance to miss the intended target. This effect is common in fixed-post sensors (e.g., seekers that are not gimbaled).

Corrective beam pointing has been conventionally observed with gimbaled configurations. In these systems, a lens or other optical element may be mounted to a gimbal which is generally free to rotate on at least one axis. Accordingly, the optical configuration may be directed to a desired angle to correct guidance errors as necessary. Unfortunately, the gimbal and supporting actuators substantially add to the cost, complexity and failure susceptibility of the system.

There is a need to correct for scintillation induced optical aberrations while preserving guidance signal amplitude, as compared with what may be otherwise achieved with existing systems.

SUMMARY OF THE INVENTION

In various representative aspects, the present invention provides a system and method for reducing the effects of atmospheric scintillation in military target acquisition, tracking and engagement. Exemplary features include a radiation source and a sensor for detecting laser radiation. The disclosed sensor generally comprises an optical lens having an at least partially undulating pattern mapped onto a curvilinear surface. The sensor assembly may also include a partially transmissive protective cover and/or various optical filter and control elements.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system employing laser designation. Certain representative implementations may include, for example, laser designation of targets and laser range finding.

A detailed description of an exemplary application, namely the laser acquisition, tracking and engagement of military targets with missiles and/or other guided ordinances, is provided as a specific enabling disclosure that may be generalized to any application of the disclosed system, device and method for reducing the effects of atmospheric scintillation and/or other optical aberrations in accordance with various embodiments of the present invention.

In an exemplary and representative embodiment, the present invention discloses the use of non-imaging optics in a semi-active laser (SAL) system to mitigate atmospheric scintillation effects. Potential uses may include "free space optics", laser communications (e.g., transceivers) for the telecommunication industry, or any missile, sensor or FLIR that utilizes a SAL receiver. The concept is especially well-suited for non-gimbaled systems.

Figure 1:
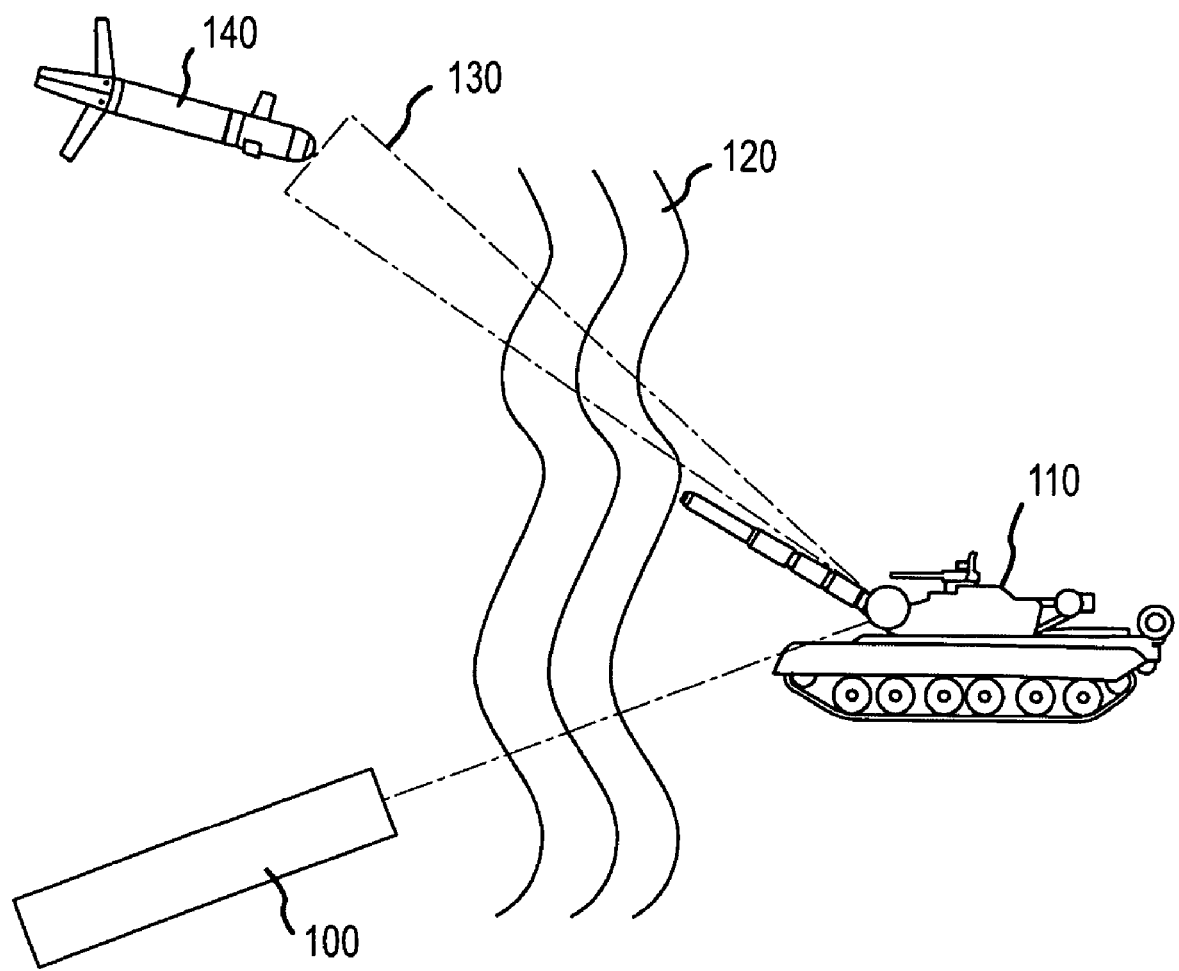
FIG. 1 representatively illustrates the effect of atmospheric scintillation induced aberrations.

As representatively depicted in FIG. 1, a SAL sensor on a missile 140 tracks a target 110 via a spot of laser light directed at it by remote laser designation 100. As the laser beam passes through the atmosphere, the beam will encounter thermal variations of air density 120 along the beam path resulting in random changes to the index of refraction along the path. The result is a scintillating effect that operates to at least partially diffuse the coherency of the beam 130 as well as to introduce random fluctuations of the observed power of the beam. This same effect is responsible for the "twinkling" of starlight as observed on an otherwise clear and cloudless night sky.

Atmospheric turbulence 120 (e.g., thermal variations) will typically create guidance errors, causing the ordinance to miss a target. In addition to diffusing the tracking beam 130, atmospheric turbulence 120 generally produces a non-uniform laser spot on the detector. Computer simulations of this effect demonstrate rapid fluctuations of regional beam intensity incident on the detector producing several hot spots. Measurements have been taken that show atmospheric effects can block up to half the available detection aperture. This effect is common in fixed-post sensors (e.g., non-gimbaled seekers). Detectors having smaller collecting diameters (on the order of 1" or less) will typically demonstrate more dramatic irradiance variations across the collecting pupil than detectors with larger collecting diameters.

Figure 2:
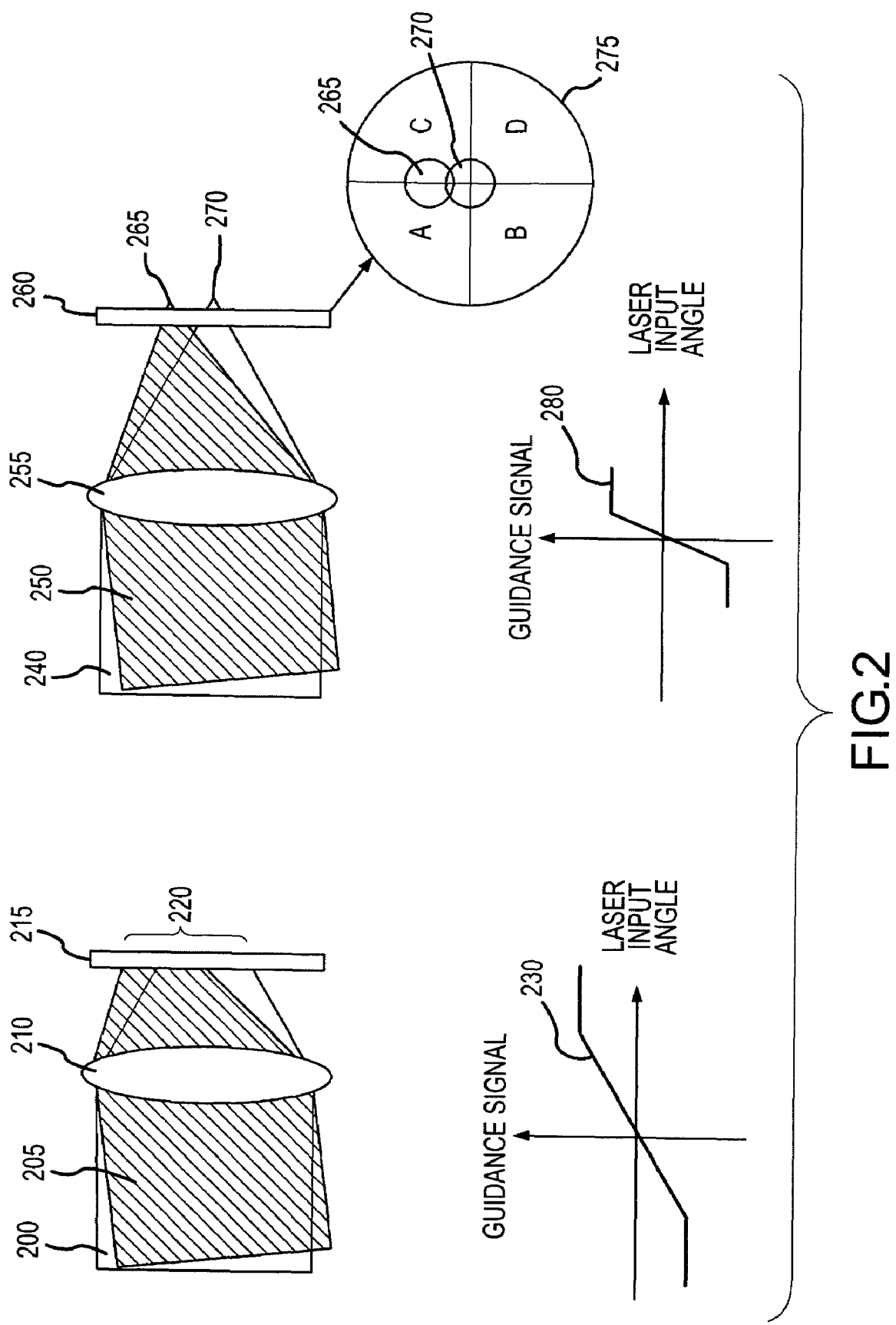
FIG. 2 representatively illustrates signal amplitude variance as a function of field of view (FOV) for body-fixed and gimbaled systems.

FIG. 2 generally shows gimbaled (small spot) 265, 270 and body-fixed (large spot) 220 assemblies. In the gimbaled system, lens 255 is exposed to incident laser radiation 240, 250 to produce a guidance signal 280 on detector 260 as a result of focusing laser light 265, 270 on the detector 260. A view 275 of detector 260 normal to the incidence of laser light 265, 270 shows the pattern of energy deposition on various quadrants (A, B, C and D) of detector 260. The gimbaled lens 255 is generally suitably adapted to rotate in azimuth and elevation to correct for pointing error by mechanically shifting the focal point on the surface of detector 260. In such configurations, the guidance signal S (280) is generally given as the ratio of the difference of the power deposition on the detector quadrants (A, B, C, D) over the sum of the power deposition on the quadrants (A, B, C, D):

$$S = \frac{(A+B)-(C+D)}{\sum(A+B+C+D)}$$

The second assembly in FIG. 2 generally depicts incident laser radiation 200, 205 defocused by lens 210 in a body-fixed configuration, resulting in a larger deposition of energy 220 on detector 215. As the corresponding guidance signal 230 shows, the body-fixed configuration 210 generally requires a larger FOV, and consequently, a larger spot of energy deposition 220 and more defocus on detector 215. The guidance signal 280 for conventional gimbaled assemblies 255 spans a narrower laser input angle, but generally may not be used with larger FOV's, while the guidance signal 230 for conventional body-fixed assemblies 210 spans a wider laser input angle, but generally introduces increased optical aberration.

Figure 3:
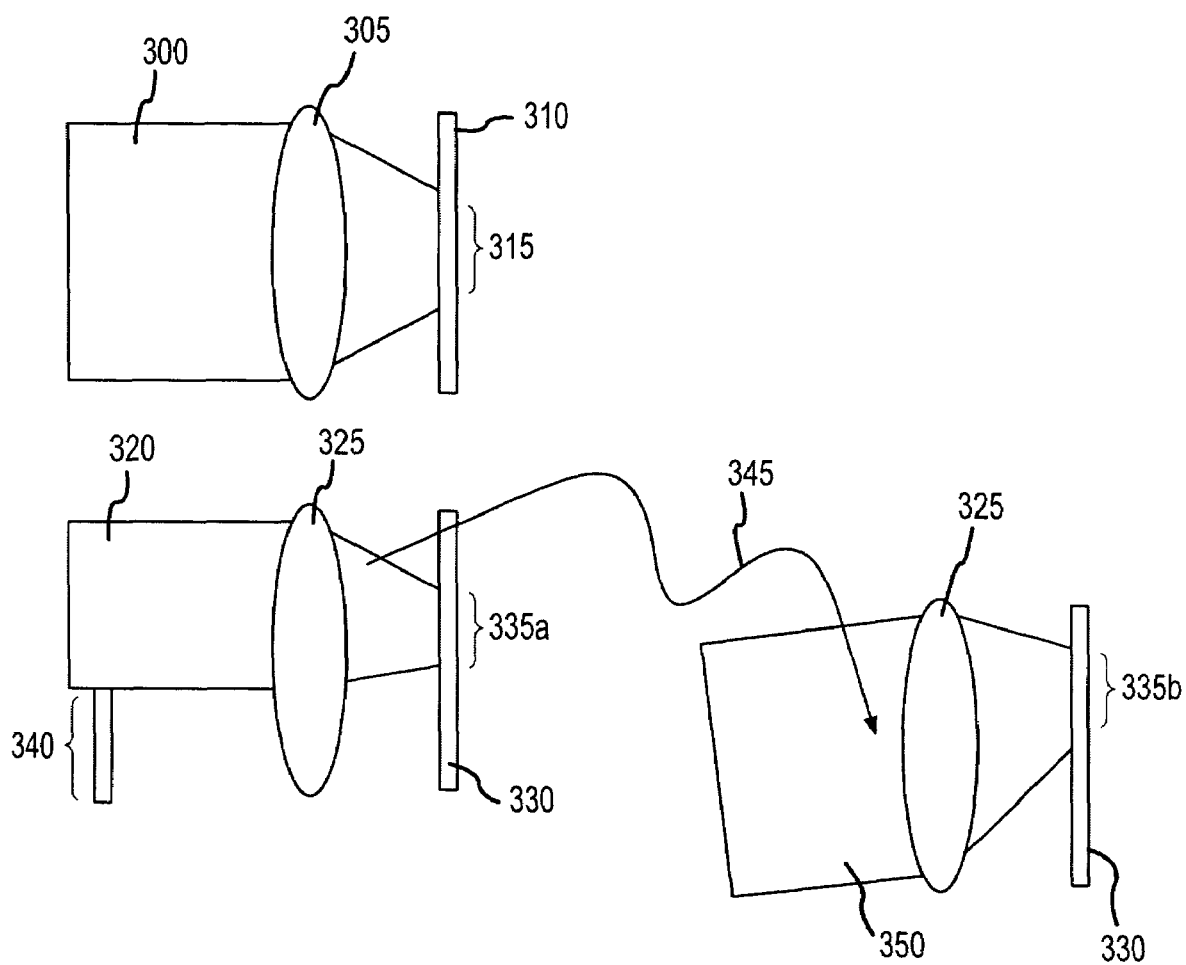
FIG. 3 representatively illustrates the phenomenology of scintillation induced amplitude loss and guidance system pointing errors.

FIG. 3 depicts a configuration where energy loss associated with scintillation effects may be perceived by the detector as a guidance pointing error. Under normal circumstances, incident laser radiation 300 will be focused by lens 305 onto detector 310 in a region to produce a guidance signal 315. If, however, a portion 340 of the radiative power is deleted from the incident beam 320 (as in the case of atmospheric scintillation), lens 325 focuses the beam on a smaller region 335a of detector surface 330. Within the limit of detector 330's ability to characterize power fluctuations, the focusing of the beam on a smaller region 335a (offset with respect to the reference center of signal deposition 315 absent scintillation effects) generally corresponds (345 as exaggerated in FIG. 3) to an incident beam 350 shift, where the positional power deposition 335b on detector 330 is interpreted as a vector pointing error. The navigation system may then erroneously attempt to correct tracking and guidance to the target when the path of approach was in fact "on course" but for the appearance of the pointing error associated with atmospheric scintillation.

Prior attempts to resolve this problem have included complicated systems employing coherent fiber bundles to mix spatial power over the aperture, thereby reducing the effects of atmospheric scintillation. However, this approach reduces the power incident on the detector (resulting in decreased system sensitivity) due to the use of fiber optic face plates. Other attempts to resolve the problem have included complicated optical assemblies employing polyhedral facing (e.g., axicon or polyhedral surfaces). In such systems, if the aperture is partially blocked (e.g., from atmospheric scintillation) the spot remains roughly the same size and in the same position. This method reduces the pointing error and works for small spot gimbaled systems, but does not work well for body-fixed systems requiring a larger spot.

Figure 4:
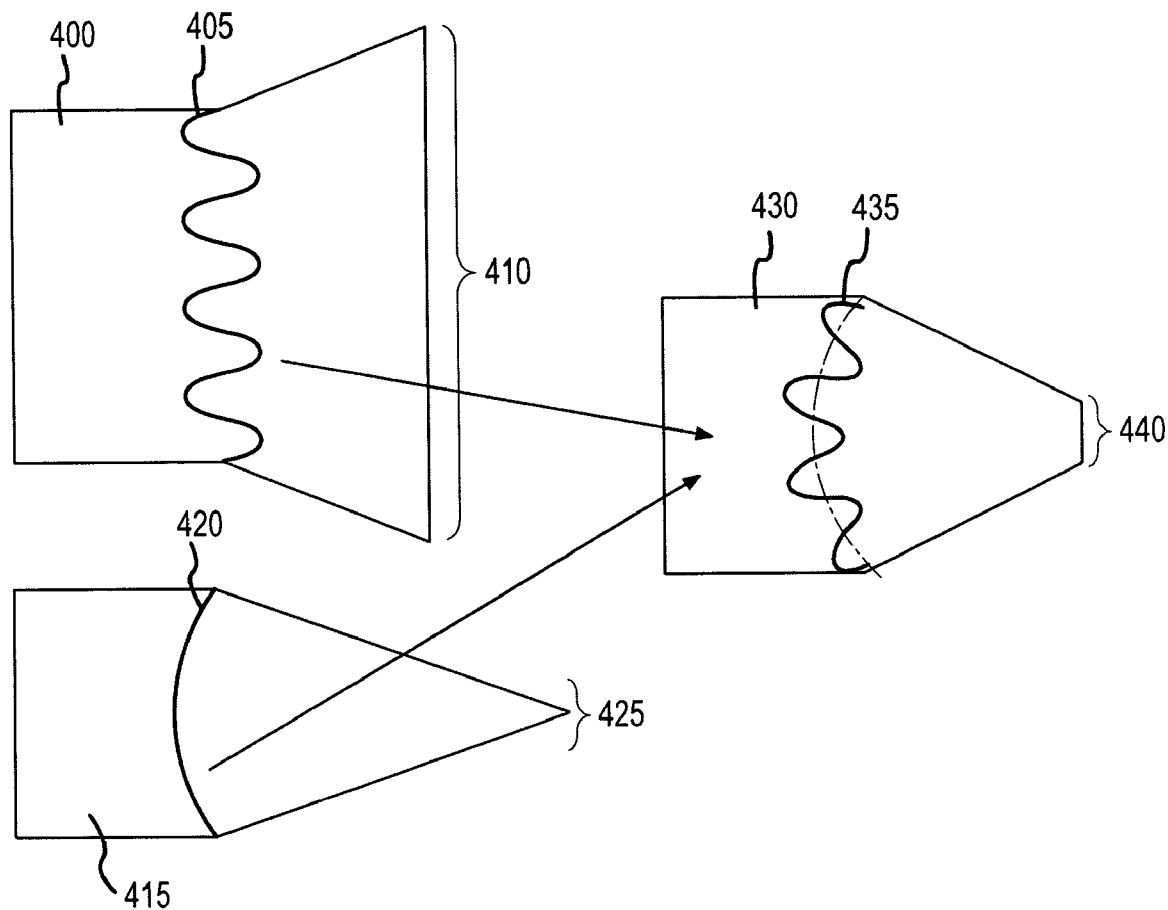
FIG. 4 representatively depicts a system for correcting scintillation induced aberrations in accordance with an exemplary embodiment of the present invention.

As shown in FIG. 4, an exemplary and representative embodiment of the present invention discloses an undulating washboard surface 435 mapped onto a curvilinear section. Taken alone, the washboard surface 405 generally operates to diffuse or defocus 410 an incident beam profile 400, while the concave curvilinear section 415 generally operates to focus 425 an incident beam profile 415. Taken together, the washboard surface 435 mapped onto the concave curvilinear section operates to homogenize the beam (due to the defocusing and mixing effect of the undulating washboard pattern 405) while focusing the beam (due to the concave curvilinear section 420) over a given region (i.e., an external aperture) 440 for a particular focal length. By mapping an undulating surface on a curvilinear section, both goals are accomplished; namely mixing an incident beam without power loss over a given region of focus. The combined surface results in "scintillation hardening".

In exemplary embodiments, an at least partially undulating pattern may be mapped on at least partially curvilinear surface. Representative undulating patterns may include, for example: a regular pattern, an irregular pattern, a chaotic pattern, a random pattern, a mathematically functionalized pattern, a sinusoidal pattern, a uniformly corrugated pattern, a non-uniformly corrugated pattern, a pattern resulting from a relatively high frequency of oscillation, a pattern resulting from a medium frequency of oscillation, a pattern resulting from a relatively low frequency of oscillation, a pattern resulting from a radially dependent variation in amplitude, a pattern resulting from a radially dependent variation in frequency, aspheric topological features to account for higher order correction of optical aberrations, as well as any other type of pattern, whether now known or otherwise hereafter described in the art. It will be appreciated that a variety of patterns may be applied as mapped onto a curvilinear surface in order to produce a substantially similar result as provided by the instant invention.

Representative curvilinear surfaces include, for example: a spherical section, a semi-spherical section, a hemi-spherical section, an ovoid section, a conic section, an at least partially convex surface, an at least partially concave surface, and/or any other type of curvilinear surface, whether now known or otherwise hereafter described in the art. It will be appreciated that a variety of curvilinear surfaces may be applied in conjunction with an undulating pattern mapped thereon in order to produce a substantially similar result as provided by the instant invention.

In representative embodiments, incident radiation may be configured to pass through a radome or an at least partially transparent protector to shield the internal optical assembly and support components from damage. The present invention may also be used with a variety of pre- or post-incidence bandpass filters. Sinusoidal "washboard" surfaces in accordance with the present invention have been observed to reduce scintillation induced pointing errors by up to more than an order of magnitude. See, for example, FIG. 5 and FIG. 6.

Figure 5:
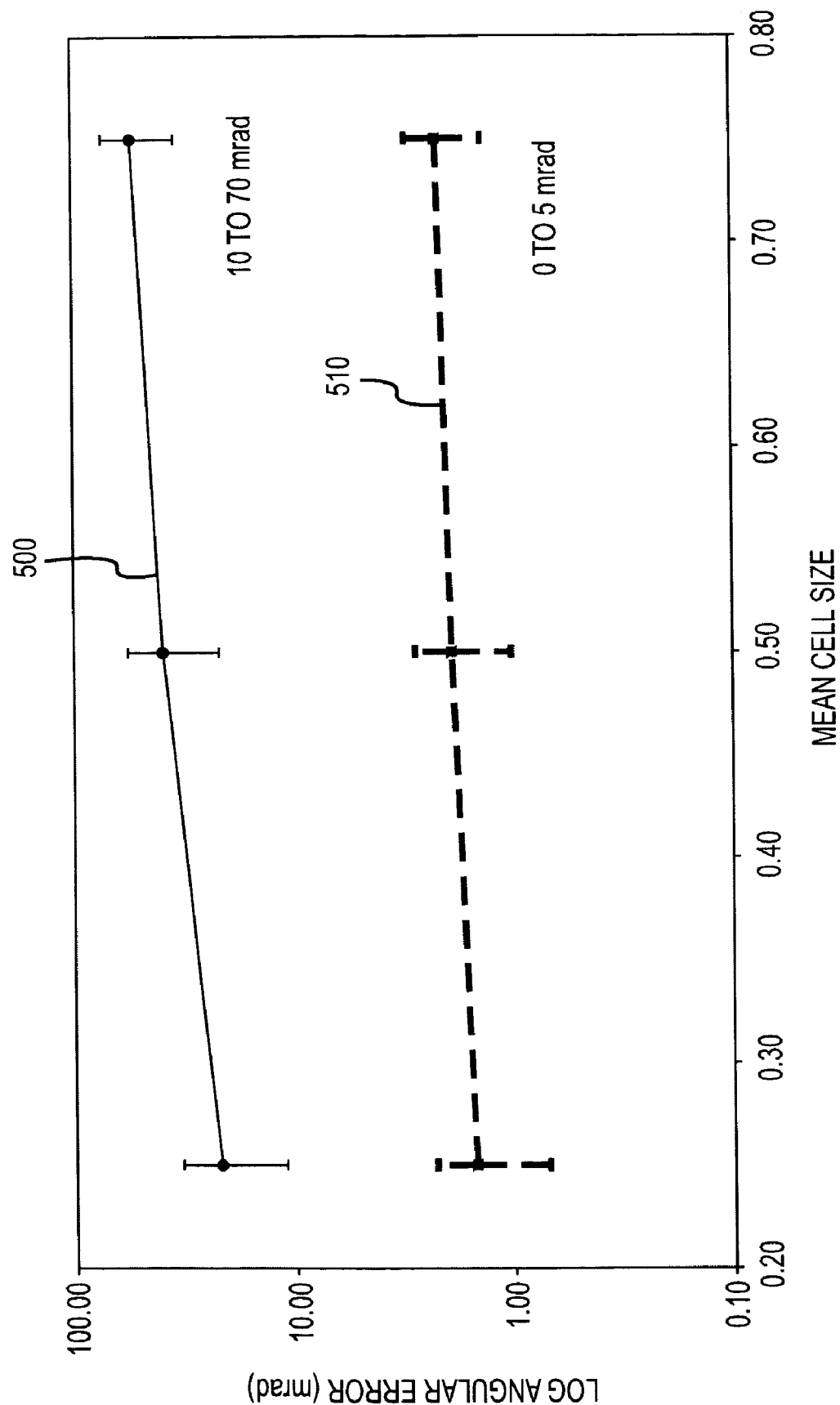
FIG. 5 representatively illustrates approximate magnitudes of scintillation induced pointing error as a function of mean cell size with thirty percent (30%) aperture loss.
Figure 6:
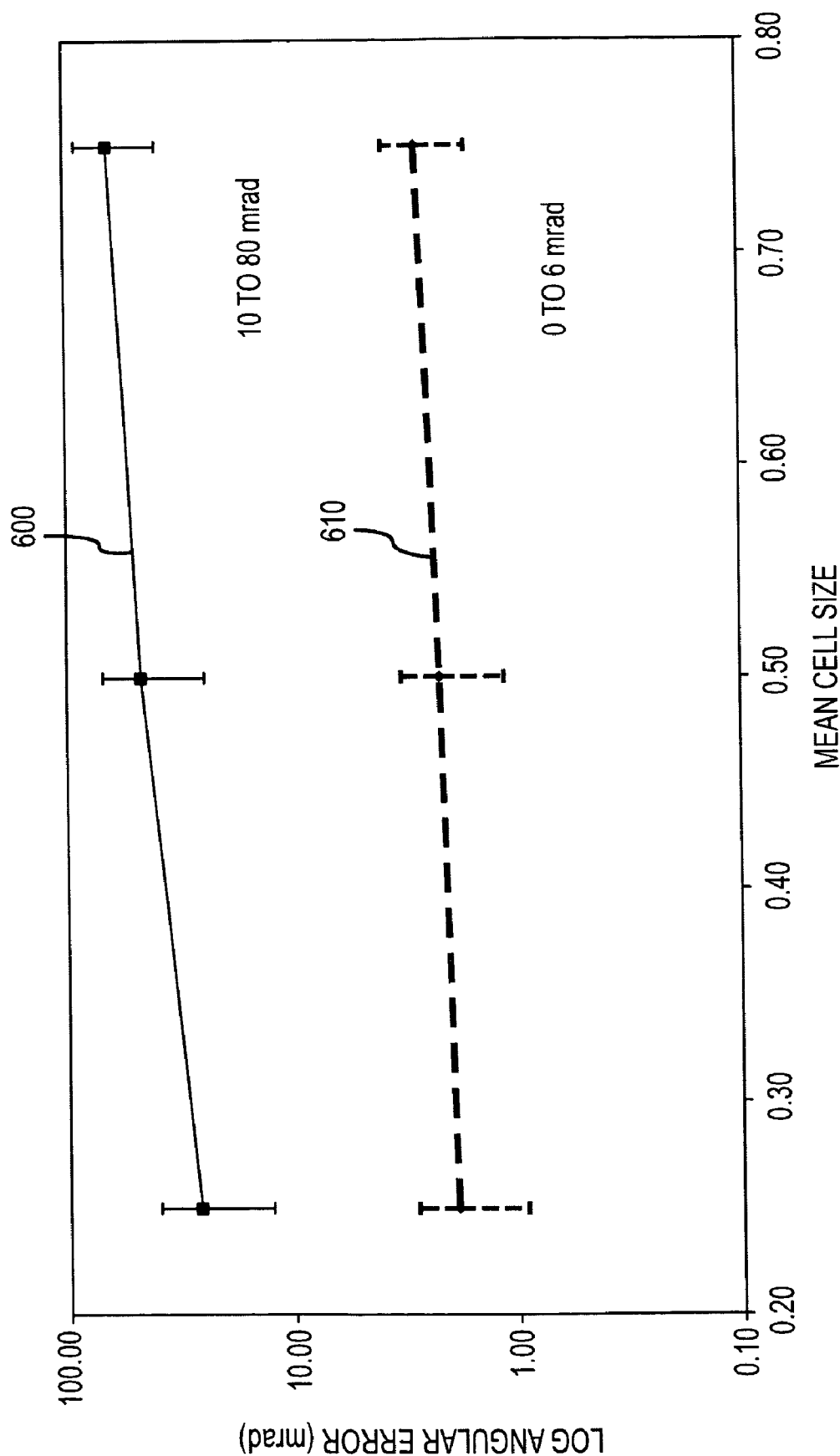
FIG. 6 representatively illustrates approximate magnitudes of scintillation induced pointing error as a function of mean cell size with forty percent (40%) aperture loss.

As shown in FIG. 5 (with 30% aperture loss), angular error 500 for a defocused CCD detector was measured between 10 to 70 miliradian (mrad), while a sinusoidal pattern mapped on a curvilinear surface in accordance with an exemplary embodiment of the present invention demonstrated angular error 510 between 0 to 5 mrad. As shown in FIG. 6 (with 40% aperture loss), the improvement was even more pronounced; angular error 600 for a defocused CCD detector was between 10 to 70 mrad, while a sinusoidal pattern mapped on a curvilinear surface in accordance with an exemplary embodiment of the present invention, only demonstrated angular error 610 between 0 to 5 mrad.

Figure 7:
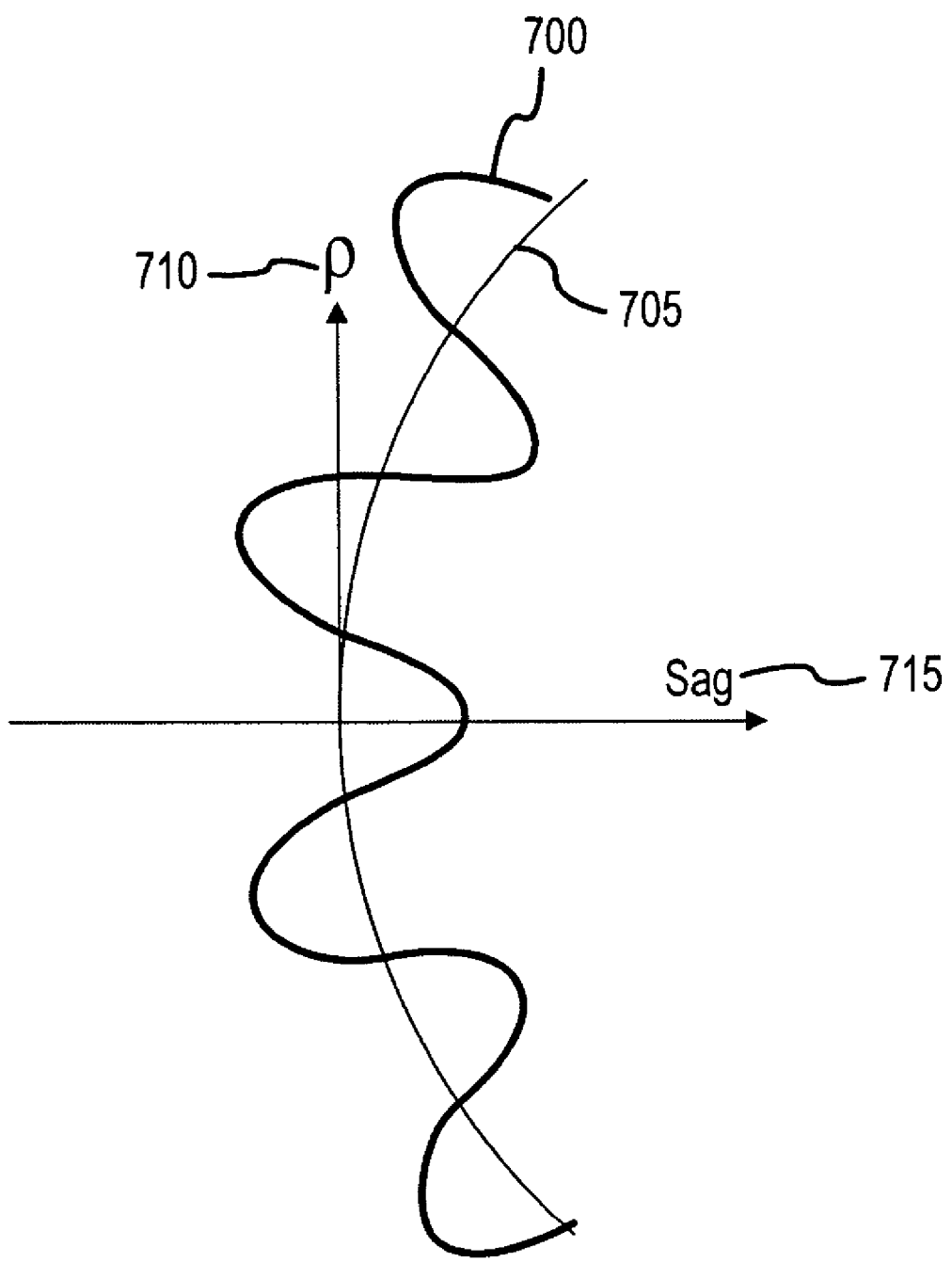
FIG. 7 depicts representative parameters that may be employed for describing exemplary features of an undulating pattern mapped onto a curvilinear section in accordance with various embodiments of the present invention.

As depicted in FIG. 7, "sag" 715 (as a measure of deviation from planarity) is given as:

$$Sag = Sag_A + Sag_W$$

where $Sag_A$ represents aspheric deviation from planarity associated with curvilinear section 705 and $Sag_W$ represents the localized deviation from planarity associated with "washboard" pattern 700.

The aspheric sag may be further represented by:

$$Sag_A = \frac{\frac{\rho^2}{R}}{1 + \sqrt{1 - (1+k) \cdot \frac{\rho^2}{R^2}}} + A \cdot \rho^4 + B \cdot \rho^6 + \ldots + \beta \cdot \rho^{2N}$$

where $\rho$(710) is the aperture size, R is the radius of spherical curvature, $\kappa$ is the conic constant, and $A \cdot \rho^4 + B \cdot \rho^6 + \ldots + \beta \cdot \rho^{2N}$ represent aspheric terms for higher order correction of aberrations.

The "washboard" sag may be further represented by:

$$Sag_W = A(\rho) \cdot \cos[2 \cdot \pi \cdot \eta(\rho)]$$

where $A(\rho)$ is the amplitude as a function of aperture size, given as:

$$A(\rho) = (A_0 + A_1 \cdot \rho^1 + \ldots + A_N \cdot \rho^N)$$

and $f(\rho)$ is the frequency as a function of aperture size, given as:

$$f(\rho) = (f_0 + f_1 \cdot \rho^1 + \ldots + f_N \cdot \rho^N)$$

Accordingly, the simplest form for describing the localized "washboard" sag is:

$$Sag'_W = A \cdot \cos[f \cdot \rho]$$

It will be appreciated that several techniques may be employed to fabricate optical elements in accordance with various exemplary embodiments of the present invention. For example, suitably adapted lenses may be molded or milled (e.g., diamond turning) in accordance with representative embodiments of the present invention. Appropriately configured surface topologies may also be defined via etching and/or blasting. Additionally, Stamp and Flash Imprint Lithography (SFIL) may be used to mass produce suitable optical elements.

Step and Flash Imprint Lithography (SFIL) uses photopolymerization of an organosilicon solution through a rigid transparent imprint template to define a pattern topography on a substrate. The use of a low-viscosity UV curing solution allows imprinting at room temperature with minimal applied pressure. Typically the imprinting process is performed over a blanket layer of organic polymer, creating a bilayer structure. This generally removes the need to imprint high aspect ratio features, since the pattern aspect ratio can be subsequently amplified by dry etching.

The use of a rigid transparent imprint template allows flood exposure of the photopolymer to achieve cure and enables classical optical techniques commonly used in mask aligners, photolithography steppers and scanners for layer-to-layer alignment. Details of the SFIL process generally include the following steps:

An organic polymer transfer layer is spin-coated on a substrate, typically silicon;

A low viscosity, photopolymerizable, organosilicon solution (etch barrier) is then dispensed on the substrate in the area to be imprinted;

A transparent template bearing patterned relief structures is aligned over the coated substrate;

The template is lowered onto the substrate, displacing the etch barrier that fills the imprint field and trapping the etch barrier solution in the template relief. Irradiation with UV light through the backside of the template cures the etch barrier into a crosslinked polymer film. A fluorocarbon release layer on the template allows separation from the substrate, leaving an organosilicon relief image that is a replica of the template pattern;

A halogen etch is then used to break through the undisplaced etch barrier material (residual layer) exposing the underlying transfer layer; and An oxygen reactive ion etch (RIE) is used to transfer the image through the transfer layer thereby amplifying the aspect ratio of the imprinted image. In various representative embodiments, the organosilicon material may be matched to the index of refraction of the substrate in order to avoid undesirable optical performance of the resulting device.

Figure 8:
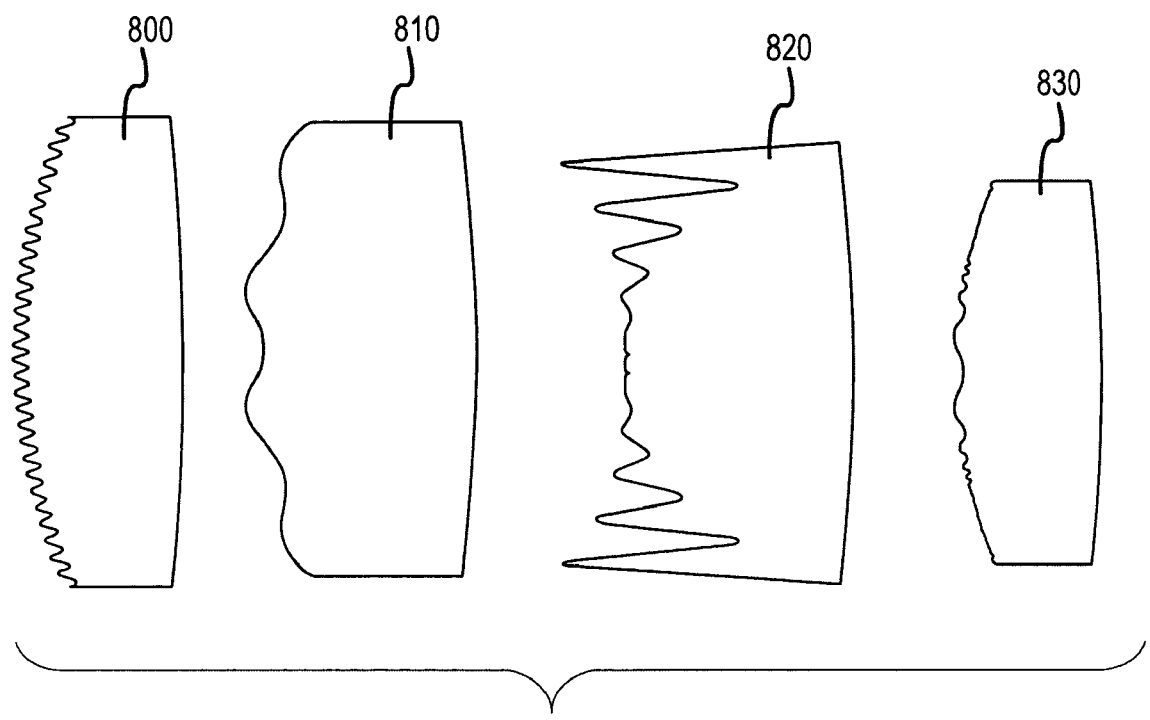
FIG. 8 representatively illustrates cross-sectional views of exemplary scintillation hardened optical surfaces in accordance with various embodiments of the present invention.
Figure 9:
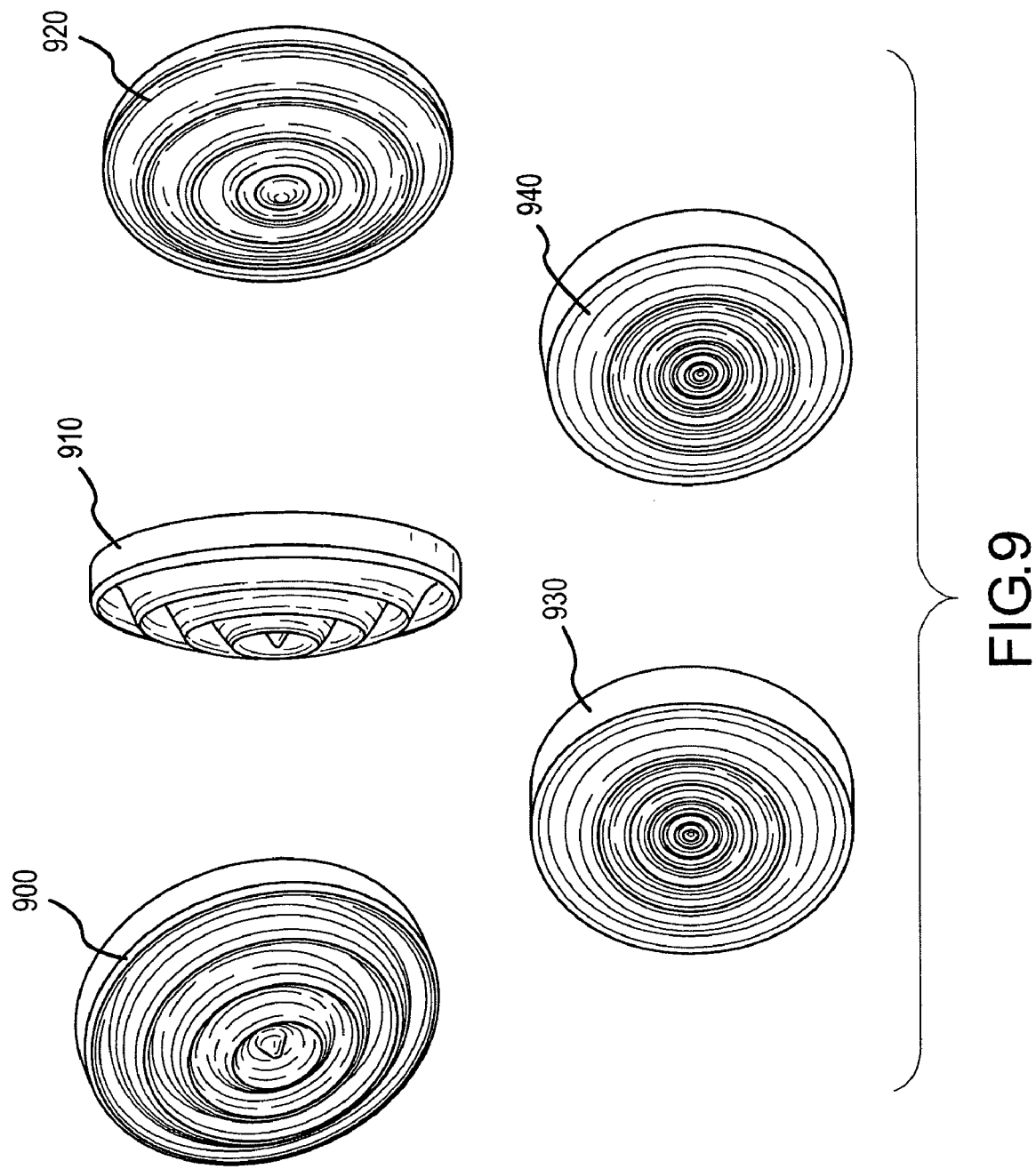
FIG. 9 representatively illustrates perspective views of exemplary scintillation hardened optical surfaces in accordance with various embodiments of the present invention.

FIG. 8 representatively depicts representative patterns that may be obtained, including for example: high frequency features 800, low frequency features 810, topological features resulting from radial variation of amplitude 820, features resulting from radial variation of frequency 830, and/or the like. FIG. 9 generally depicts other representative lens patterns (900, 910, 920, 930 and 940) in perspective view.

The disclosed lenses, in accordance with various representative embodiments of the present invention, provide a large homogenized spot which is less sensitive to atmospheric scintillation for use with, for example, body-fixed missile guidance systems.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims.

Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. An optical device for reducing the effects of atmospheric scintillation upon radiation incident on a detector, comprising:
    a non-imaging lens adapted to distribute the radiation on the detector, wherein the lens comprises;
    a curvilinear surface adapted to focus the radiation on the detector; and
    an undulating surface integrated into the curvilinear surface, wherein the undulating surface non-randomly spatially homogenizes the radiation on the detector; and
    wherein said spatial homogenization and focusing operate to provide the reduction of atmospheric scintillation effects that may be observed with said lens.

2. The device of claim 1, wherein said curvilinear surface comprises at least one of a spherical section, a semi-spherical section, a hemi-spherical section, an ovoid section, and a conic section.

3. The device of claim 2, wherein the surface of incidence of said radiation upon said lens comprises at least one of a substantially planar surface, a substantially convex surface, and a substantially concave surface.

4. The device of claim 2, wherein the surface of refraction of said radiation from said lens comprises at least one of a substantially planar surface, a substantially convex surface, and a substantially concave surface.

5. The device of claim 1, wherein said undulating surface comprises a substantially regular pattern.

6. The device of claim 5, wherein said regular pattern comprises topological features resulting from the application of a mathematical formula.

7. The device of claim 5, wherein said regular pattern comprises a sinusoidal oscillating surface.

8. The device of claim 5, wherein said regular pattern comprises at least one of a uniformly corrugated surface and a non-uniformly corrugated surface.

9. The device of claim 5, wherein said regular pattern comprises at least one of a relatively high frequency of oscillation, a medium frequency of oscillation, a relatively low frequency of oscillation, a radially dependent variation in amplitude, a radially dependent variation in frequency, and at least one aspheric feature for higher order correction of optical aberrations.

10. The device of claim 1, wherein said undulating pattern comprises a substantially irregular pattern.

11. The device of claim 10, wherein said irregular pattern comprises at least one of a random pattern and a chaotic pattern.

12. The device of claim 1, further comprising at least one of an at least partially transmissive protective cover and at least one optical filter element.

13. A method for reducing the effects of atmospheric scintillation, upon radiation incident on a detector, comprising:
    placing a non-imaging optical lens in an optical path of the detector, wherein;
    the lens is adapted to distribute the radiation irradiance on the detector;
    and
    the lens comprises a curvilinear surface adapted to focus electromagnetic radiation, and the curvilinear surface comprises a pattern of undulation mapped thereon adapted to non-randomly spatially homogenize electromagnetic radiation on the detector wherein said spatial homogenization and focusing operate to provide the reduction of atmospheric scintillation effects that may be observed with said lens.

14. The method of claim 13, wherein said undulating pattern comprises topological features resulting from the application of a mathematical formula.

15. The method of claim 14, further comprising at least one of:
   providing a radial variation in amplitude to topological features of the lens;
   providing a radial variation in frequency to topological features of the lens; and
   providing at least one aspheric topological feature for higher order correction of optical aberrations.

16. The method of claim 13, further comprising at least one of:
   providing an at least partially transmissive protective cover; and
   providing at least one optical filter element.

17. The method of claim 13, wherein said undulating pattern of said curvilinear surface is produced by at least one of etching, molding, abrasive blasting, milling, and Step and Flash Imprint Lithography (SFIL).

18. A system for reducing the effects of atmospheric scintillation upon radiation in target acquisition, tracking and engagement, comprising:
   a structure defining an aperture and an optical path; and
   a sensor disposed in the optical path and adapted to detecting radiation, said sensor comprising;
      a detector in the optical path; and
      an non-imaging optical lens in the optical path and adapted to distribute radiation on the detector; wherein said lens has a curvilinear surface, wherein the curvilinear surface of the lens is adapted to focus the radiation on the detector; and
   a pattern of undulation mapped onto the curvilinear surface of the lens and adapted to non-randomly spatially homogenize the radiation on the detector;
   wherein said spatial homogenization and focusing operate to provide the reduction of atmosphere scintillation effects that may be observed with said lens.

19. The system of claim 18, wherein said radiation comprises substantially coherent electromagnetic radiation.

20. The system of claim 18 wherein said sensor further comprises at least one of an at least partially transmissive protective cover and at least one optical filter element.

* * * * *